(12) United States Patent
Nocera

(10) Patent No.: US 7,431,030 B2
(45) Date of Patent: Oct. 7, 2008

(54) SOLAR PANEL FOR WATER-HEATER

(75) Inventor: Pierre-Jean Nocera, Ajaccio (FR)

(73) Assignee: OCV Intellectual Capital, LLCDE (US)

( * ) Notice: Subject to any disclaimer, the term of this patent is extended or adjusted under 35 U.S.C. 154(b) by 0 days.

(21) Appl. No.: 10/793,274

(22) Filed: Mar. 5, 2004

(65) Prior Publication Data

US 2004/0255932 A1 Dec. 23, 2004

(30) Foreign Application Priority Data

Mar. 6, 2003 (FR) .................................. 03 02740

(51) Int. Cl.
*F24J 2/04* (2006.01)

(52) U.S. Cl. ................. 126/643; 126/652; 126/668; 126/672

(58) Field of Classification Search ............. 126/643 O, 126/652 X, 668 X, 672 X, 663, 705, 706
See application file for complete search history.

(56) References Cited

U.S. PATENT DOCUMENTS

| 4,178,910 A | * | 12/1979 | Gramer et al. | ............. | 126/677 |
| 4,257,398 A | * | 3/1981 | Watson | ....................... | 126/612 |
| 4,278,072 A | * | 7/1981 | Ryan et al. | .................. | 126/632 |
| 4,290,413 A | | 9/1981 | Goodman et al. | | |
| 4,310,182 A | * | 1/1982 | Vandenbossche | ............. | 285/40 |
| 4,397,305 A | * | 8/1983 | Keefe | .......................... | 126/665 |
| 5,018,263 A | * | 5/1991 | Stern | .......................... | 29/469.5 |
| 6,008,448 A | * | 12/1999 | Peck | .......................... | 136/245 |

FOREIGN PATENT DOCUMENTS

| FR | 1 094 368 | 5/1955 |
| FR | 2 385 057 | 10/1978 |
| GB | 2 147 407 | 5/1985 |
| JP | 56-108050 | 8/1981 |
| JP | 58-64458 | 4/1983 |

* cited by examiner

*Primary Examiner*—Alfred Basichas
(74) *Attorney, Agent, or Firm*—Margaret S. Millikin; James J. Dottavio

(57) ABSTRACT

Solar panel for water-heater of the type comprising a heat exchanger made of moulded synthetic material, having a plurality of passages 7 in which a heat-exchanging fluid can circulate and a translucent cover sheet 17 attached to the exchanger with a clearance, characterized in that the heat exchanger constitutes the brace supporting the panel and consists of two identical half-shells 1a, 1b furnished with parallel longitudinal central projecting ribs 2a, 2b and one projecting edging rib 4a, 4b of greater dimension than a central rib, the two half-shells being bonded or heat sealed so that the central ribs define the abovementioned passages 7 and that the respective edging ribs 4a, 4b define a sealed hollow edging frame full of insulating air confined on the periphery of the exchanger.

12 Claims, 6 Drawing Sheets

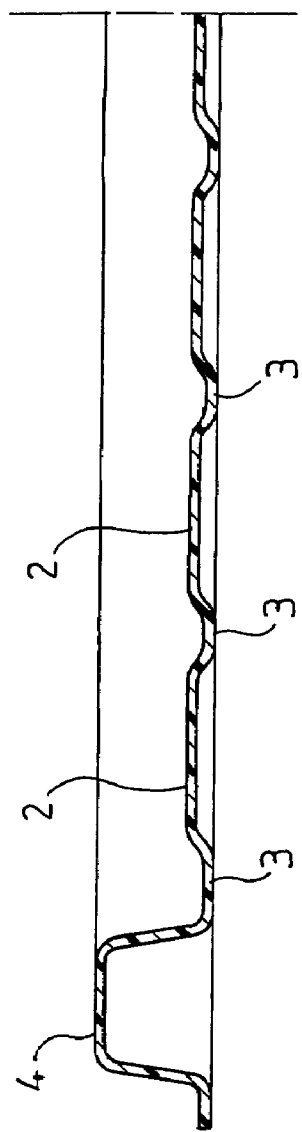
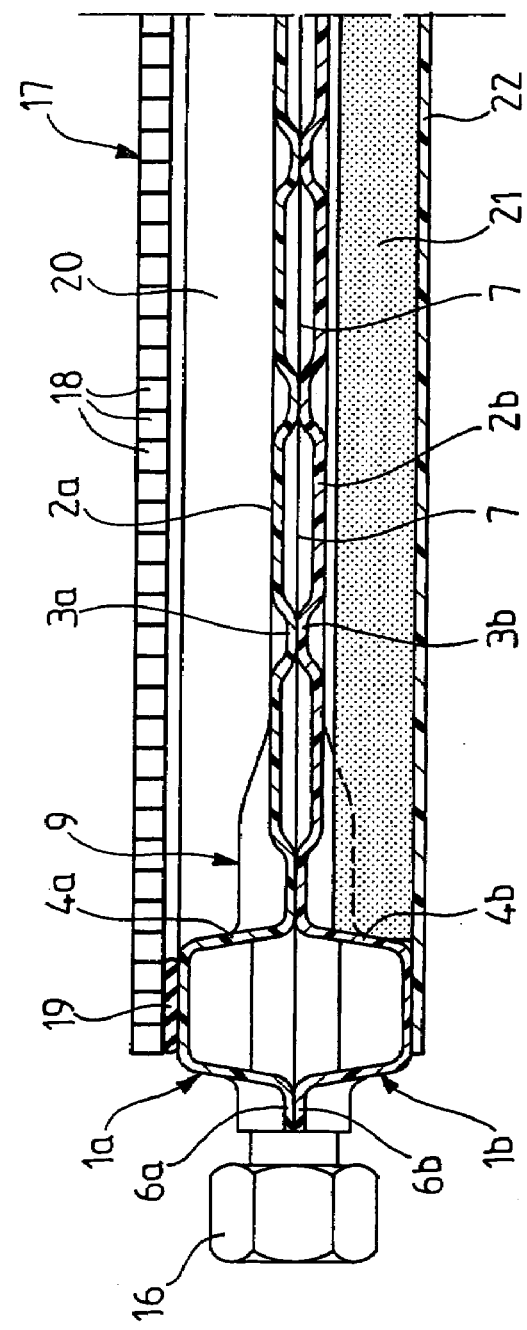
FIG.5
FIG.6

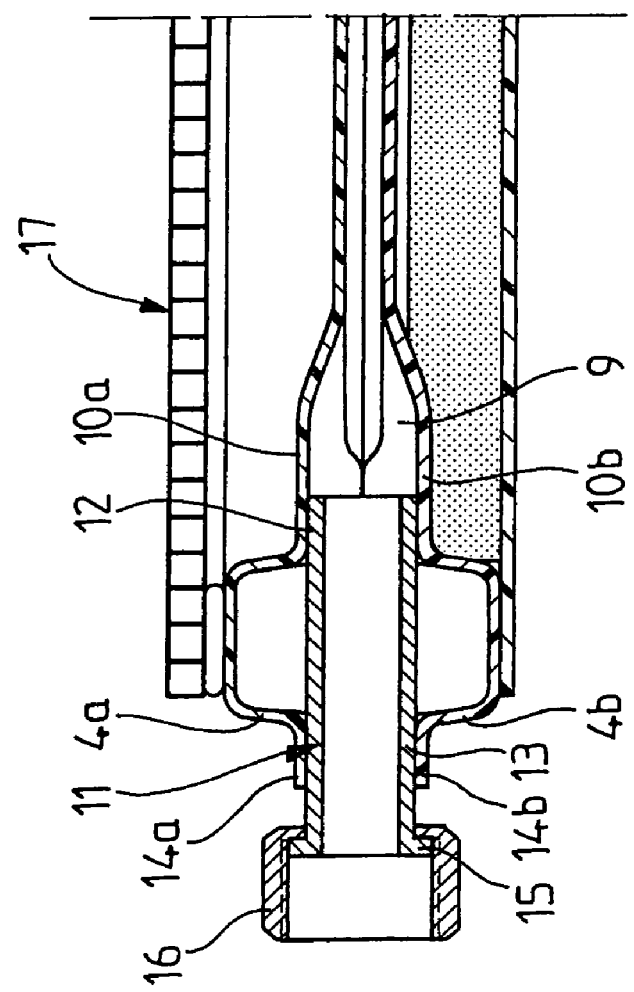

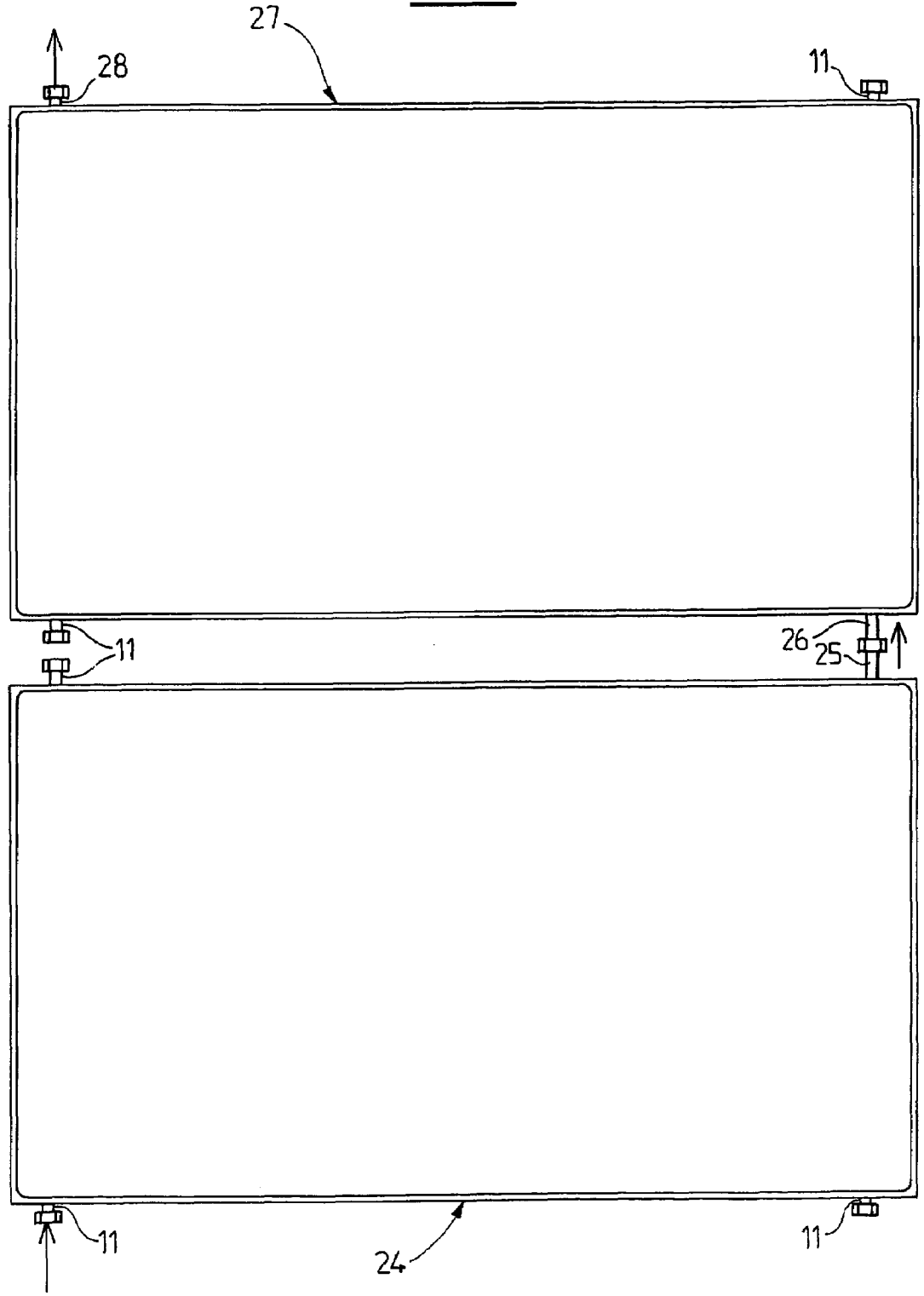

SOLAR PANEL FOR WATER-HEATER

The subject of the present invention is a solar panel for water-heater intended to be fitted to a sanitary or heating hot water production system, the panel being capable of collecting the solar energy and transmitting it to a heat-exchanging fluid which may be the water intended to be used or another fluid.

Solar panels of this type are already known, usually made of a metallic material that may comprise for example an absorbent device consisting of a copper tube carrying a plurality of aluminium fins to increase the surface of exchange. The tube, which plays the role of a heat exchanger, is usually mounted in a support module leaving a space acting as an air pocket between the tube, the heat exchanger, fitted with its fins, and a translucent cover sheet allowing the rays of the sun to pass through and increasing the temperature of the air pocket in contact with the heat exchanger tube by means of the greenhouse effect.

Panels of this type have a certain number of drawbacks due to their mainly metallic structure. Specifically, the fabrication of these devices is made complex by the problems of assembly and welding. The assembly is heavy, which causes constraints on the installation of these panels, for example on the roofs of buildings. In addition, this type of panel is relatively thick overall (from 10 to 20 cm) due to the need to allow an air gap on each side of the tube with fins, the heat exchanger.

Also known are solar panels made of synthetic materials. Thus, French patent application 2 787 868 describes a solar panel of a structure entirely moulded in composite synthetic material, much lighter than a conventional panel made of metal, thinner and more weather resistant. This solar panel however comprises not only a heat exchanger device consisting of at least one ribbed sheet made out of a moulded composite synthetic material, but also a support module inside which the heat exchanger device is mounted. The result is a certain complexity of fabrication and assembly of the different parts.

U.S. Pat. No. 4,397,305 describes a solar panel comprising a solar energy collector defining a hollow frame and a plurality of passages for the heat-exchanging fluid, the whole assembly being cast by centrifugal moulding or thermal blow-moulding, in a single piece, without welding or bonding. It is also specified in this document that it is essential to make the hollow frame communicate with the outside atmosphere in order to create a circulation of cooling air in the hollow frame and the air pocket which is above the passages of the collector in order to keep the air temperature at an acceptable level, below approximately 104° C.

Such an embodiment causes fabrication problems likely to make its cost prohibitive. In addition, the necessary air circulation in the hollow volumes of the panel causes a notable reduction in efficiency.

The object of the present invention is to remove the drawbacks of the known devices and provide a solar panel that is particularly simple to fabricate and is also particularly highly efficient.

Another object of the invention is a solar panel that is extremely thin and extremely light and can therefore be easily installed, for example on building roofs.

The solar panel for water-heater of the invention is of the type comprising a heat exchanger made of moulded synthetic material, having a plurality of passages in which a heat-exchanging fluid can circulate and a translucent cover sheet attached to the exchanger with a clearance. The heat exchanger constitutes the brace supporting the panel with no additional parts.

The exchanger consists of two identical half-shells furnished with parallel longitudinal central projecting ribs and one projecting edging rib of greater dimension than a central rib. The two half-shells are bonded or heat sealed together so that the central ribs define the passages for the heat exchanging fluid and that the respective edging ribs define a sealed hollow edging frame full of insulating air confined on the periphery of the exchanger.

This makes it possible to fabricate the solar panel rapidly and at minimum cost and to obtain an excellent calorific efficiency. Specifically, since the half-shells are identical, they can be fabricated using the same mould, preferably from a carbon or glass fibre-based fabric, preimpregnated with a synthetic resin. The moulding can be pressed by forming in a mould.

The insulating air is enclosed within the hollow edging frame at the time of moulding. The insulation provided by the air confined within the edging frame that surrounds the area of heat exchange on its whole periphery is an important feature because it lends itself to a notable increase in the efficiency of the heat exchange.

The projecting longitudinal ribs are used to obtain heat-exchanging fluid passages preferably between 5 and 10 mm thick, ideally 8 mm thick in order to reduce head losses while increasing heat transfer efficiency.

In operation, the temperature of the heat-exchanging fluid is usually between 30° C. and 90° C., more particularly around 80° C., even if the temperature of the air inside the panel may be much higher.

Preferably, the two half-shells also comprise two transverse projecting ribs of the same dimension as one of the longitudinal ribs and defining on two sides of the exchanger two collector channels in communication with the ends of the abovementioned passages.

At least two attached conduits are advantageously provided for the inlet and outlet of the heat-exchanging fluid, the conduits passing through the hollow edging frame while remaining sealed and emerging into the collector channels.

Each conduit may be fitted with a threaded captive nut for connecting to the piping for use of the heat-exchanging fluid, which may be water.

The cover sheet is bonded or heat sealed onto the hollow edging frame to define the upper face of the panel.

An insulating material is preferably placed on the lower face of the panel.

The insulating material is advantageously delimited by the hollow edging frame and is of such thickness that it does not project substantially relative to the said edging frame.

A solar water-heater according to the invention may comprise a single solar panel or at least two panels as previously described, interconnected in series.

The invention will be better understood on examination of a particular embodiment described as a non-limiting example and illustrated by the attached drawings in which:

FIG. 5 is a partial view in section along V-V in FIG. 1;

FIG. 6 is a partial view in section similar to FIG. 5, showing all the assembled elements forming the complete panel;

FIG. 7 is a partial view in section similar to FIG. 6, also showing in section the region of the conduit; and FIG. 8 is an external view in elevation of a solar water-heater fitted with two solar panels according to the invention assembled in series.

Figure 1:
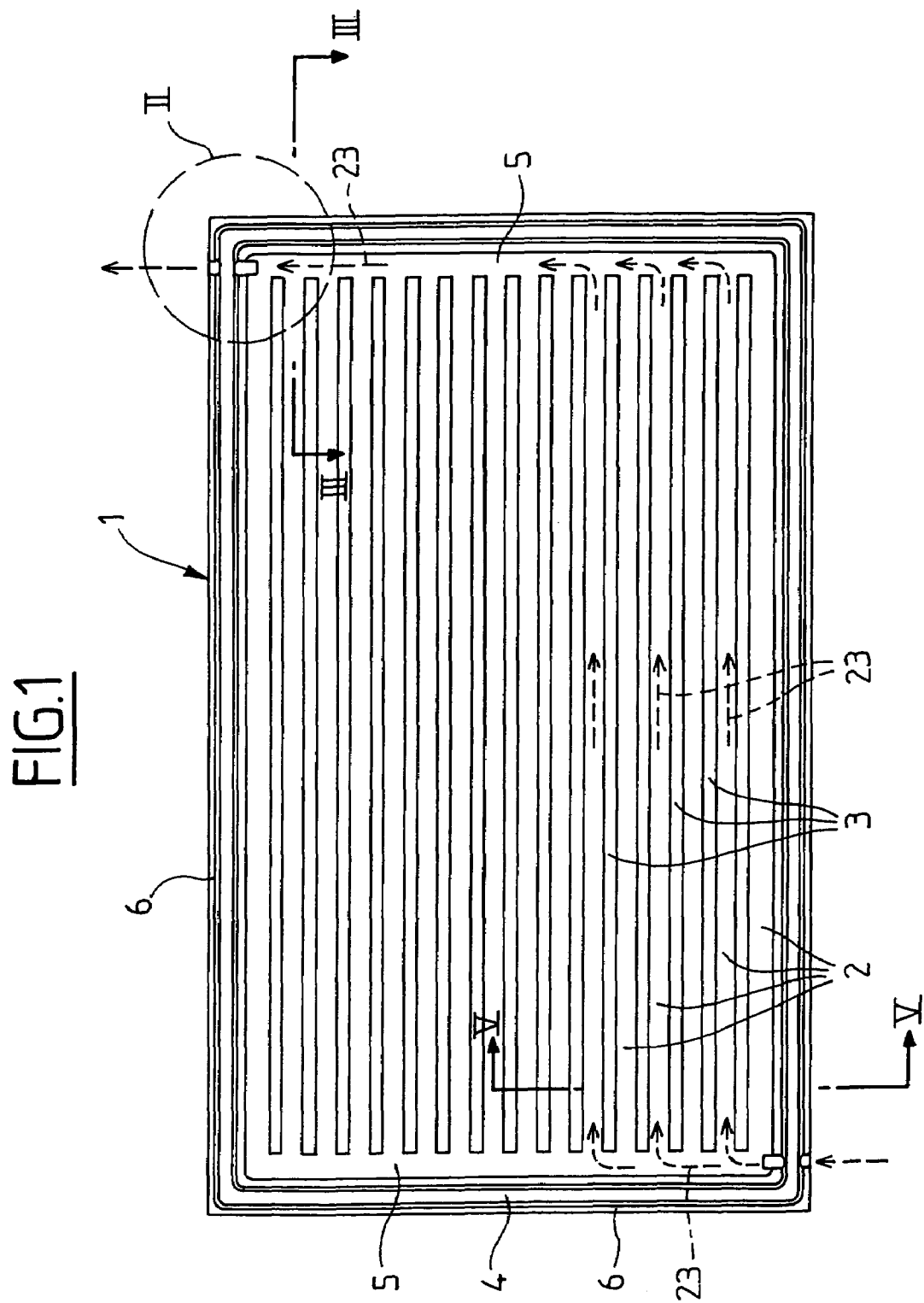
FIG. 1 is a top view of a half-shell used for the fabrication of a solar panel according to the invention.

As illustrated in FIG. 1, a half-shell 1 is of general rectangular shape. In the central portion a plurality of parallel longitudinal ribs 2 have been made, projecting relative to regions 3 situated between the various ribs 2. As will be seen later, the ribs 2, after assembly of identical half-shells, form passages for a heat-exchanging fluid. One projecting rib 4 is disposed on the whole periphery of the half-shell 1 and forms an edging for the latter. The dimension in projection of the edging rib 4 is clearly greater than the dimension in projection of the longitudinal ribs 2 as can be seen in particular in the view in section in FIG. 5. In the example illustrated, the dimension in projection of the edging rib 4 is approximately four times greater than the dimension in projection of the longitudinal ribs 2.

In the transverse direction, that is perpendicular to the longitudinal ribs 2, FIG. 5 shows that the transverse dimension of the ribs 2 is greater than the transverse dimension of the contact regions 3.

Figure 3:
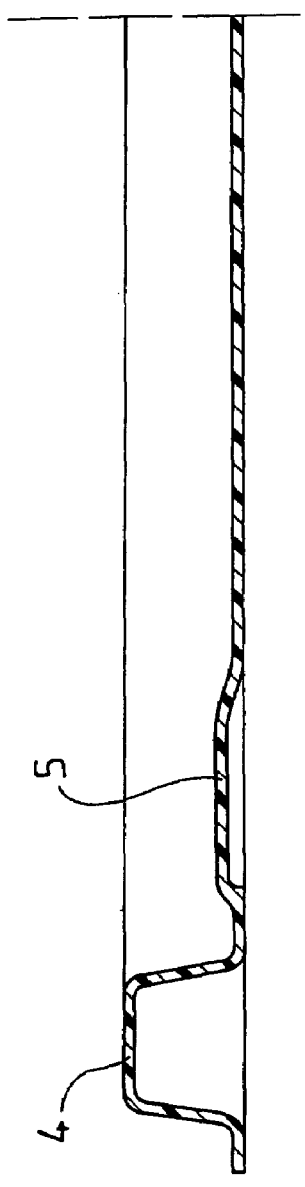
FIG. 3 is a view in section along III-III in FIG. 2.

The half-shell 1 also comprises, in the vicinity of its transverse edges and inside the edging rib 4, two projecting transverse ribs 5, with the same dimensions in projection as the longitudinal ribs 2. One of these transverse ribs 5 is visible in the view in section in FIG. 3.

The half-shell 1 may be produced by moulding a synthetic material, preferably filled with a particular heat-absorbing material, such as carbon black or comingled glass filaments soaked in a synthetic resin. It is also possible to use a woven carbon fibre material which is then impregnated with a synthetic resin and then inserted into a forming press. The half-shell 1 may be fabricated automatically at great speed. The half-shell thus obtained has a total bulk of 20 to 35 mm thickness with walls 2 to 3 mm thick. It is thus a particularly light element.

Figure 4:
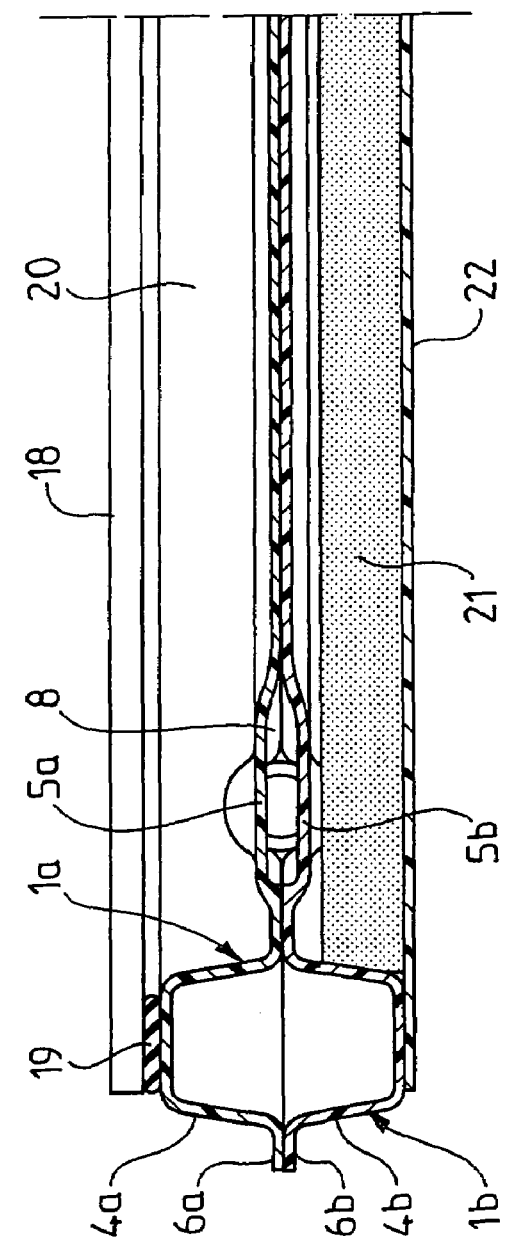
FIG. 4 is a partial view in section similar to FIG. 3, but showing all the assembled elements constituting the complete solar panel.

To produce the solar panel of the invention, visible in particular in section in FIGS. 4 and 6, two identical half-shells are used, such as the half-shell 1 seen in FIG. 1. These two identical half-shells, reference numbers 1a and 1b in FIGS. 4 and 6, are attached to one another by bonding or heat sealing along the areas of contact formed by the flat longitudinal regions 3 that are between the parallel longitudinal central ribs 2.

The two respective edging ribs 4a and 4b of the identical half-shells 1a and 1b form a sealed frame full of insulating air confined during fabrication and disposed at the periphery of the panel. Specifically, the flat extreme edges 6a, 6b of the half-shells 1a, 1b are also bonded or heat sealed along the whole periphery of the edging frame formed by the edging ribs 4a, 4b.

This is how the corresponding longitudinal ribs 2a and 2b of the two half-shells 1a and 1b define the longitudinal passages 7 for the heat-exchanging fluid, these passages being sealed along the majority of the length of the panel. At each of their ends, these passages 7 open out directly into collector channels, such as the channel 8 seen in FIG. 4, which are defined by the transverse ribs 5a and 5b of the two half-shells 1a, 1b.

Figure 2:
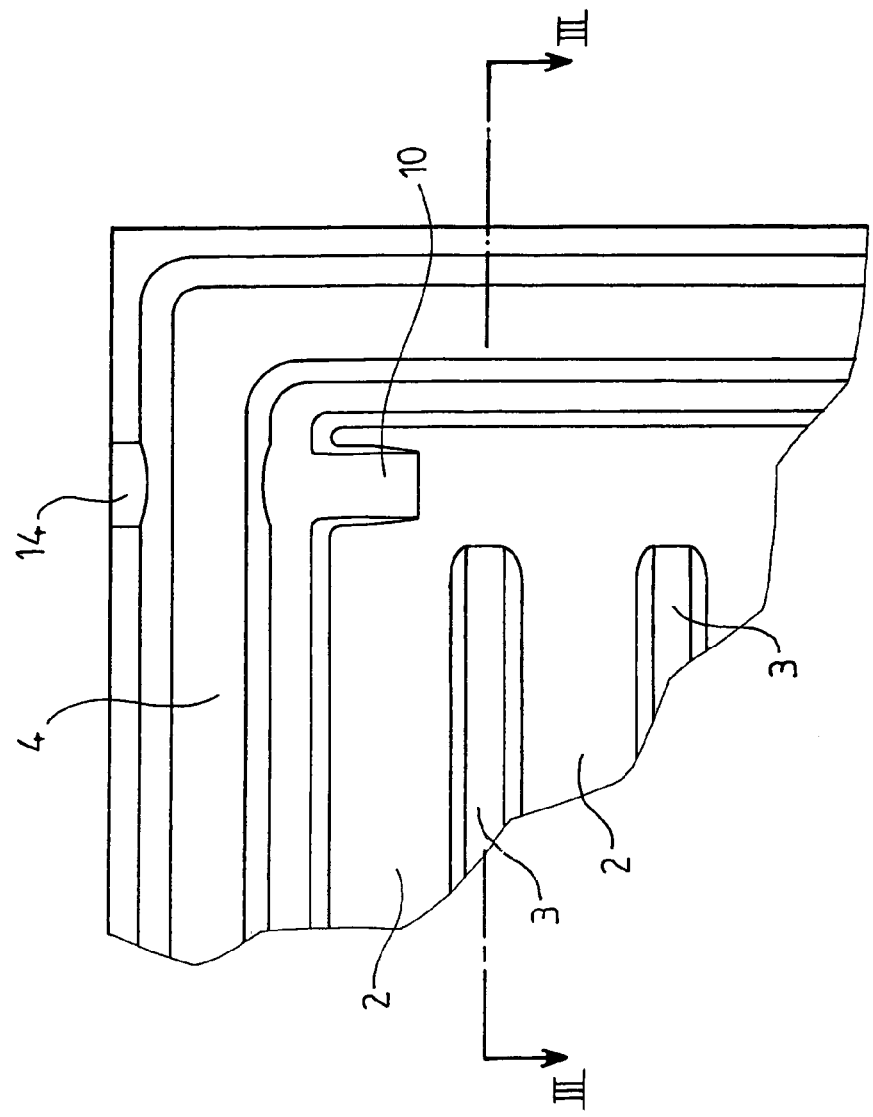
FIG. 2 is a partially enlarged view of the top right corner of the half-shell visible in FIG. 1.

Each of the collector channels 8 emerges at both ends into a nipple 9 formed by a projecting region 10a, 10b made on each of the half-shells 1 in the vicinity of at least two corners of its rectangular shape as can be seen in particular in FIG. 2. The nipple 9 seen in section in FIG. 7 is formed by the respective projecting portions 10a and 10b of the two identical half-shells 1a and 1b. A cylindrical conduit 11 may thus be attached during fabrication in the position of the nipple 9 between the two half-shells 1a and 1b and be attached to the latter by bonding or heat sealing depending on the material from which the said conduit 11 is made. The inner end 12 of the conduit 11 penetrates the interior of the nipple 9 and is attached and sealed to the walls 10a, 10b of the latter. On the outside, a portion 13 of the conduit 11 is attached to a projecting edge 14a, 14b of each of the half-shells 1a, 1b. FIG. 2 shows in particular the projecting shape of this portion 14.

The outer end of the conduit 11 has a collar 15 to retain a threaded nut 16 for connection to the piping for use of the heat-exchanging fluid. Because the conduit 11 is attached by bonding or heat sealing, it can pass through the hollow edging frame defined by the ribs 4a, 4b while remaining sealed as illustrated in FIG. 7.

The solar panel comprises not only the heat exchanger formed, as has been explained above, by the association of the two identical half-shells 1a and 1b, but also a translucent cover sheet 17 seen in FIGS. 4 and 6 having substantially the same dimensions as one of the half-shells 1. In the example illustrated, the sheet 17 is made of translucent synthetic material and comprises a multitude of parallel channels 18 visible in section in FIG. 6. The sheet 17 is attached for example by bonding by means of a bead of adhesive 19 all around the edging rib 4a of the half-shell 1a. Because of the projecting thickness of the edging 4a, which is greater than the projecting thickness of the longitudinal ribs 2a, an air pocket 20 is thus defined between the cover sheet 17 and the outer surface of the longitudinal ribs 2a which delimit the passages 17 for the heat-exchanging fluid.

On the lower face of the panel, on the side opposite the upper face which receives the cover sheet 17, there is a layer 21 of an insulating material which occupies the space delimited by the edging frame of the edging rib 4b as seen in FIGS. 4 and 6. The thickness of the insulating layer 21 is such that it does not extend beyond the projection of the edging rib 4b. The insulating layer 21 may be retained by means of a bottom fastening sheet 22 bonded to the lower surface of the edging rib 4b. In the example illustrated, the layer of insulating material 21 does not make contact with the lower surface of the longitudinal ribs 2b. In another embodiment, it would be possible to completely fill the lower space of the panel with the insulating material then being in contact with the lower surface of the longitudinal ribs 2b.

A solar panel constituted as shown in partial section in FIGS. 4 and 6 has the advantage of being particularly simple to fabricate as has been indicated previously, being extremely light and particularly thin.

The volume of air confined inside the edging frame defined by the ribs 4a, 4b is an important feature of the invention allowing the temperature of the air in the air pocket 20 and hence the thermal efficiency of the solar panel to be increased. The volume defined inside the two edging ribs 4a, 4b is sealed by the bonding or heat sealing of the two half-shells 1a, 1b and also by the particular structure illustrated in FIG. 7 which means that the conduits 11 can pass through the closed space of the edging frame while providing a seal.

In FIG. 1, two conduits are provided at diagonally opposed corners. In another embodiment seen in FIG. 8, four conduits 11 of the same type may be disposed respectively at each corner of the panel. One of these conduits is advantageously used as an inlet for the heat-exchanging fluid while another conduit situated in the corner diagonally opposite can serve as the outlet for the heat-exchanging fluid. The heat-exchanging fluid then circulates as schematized by the arrows 23 in FIG. 1. The other conduits, which are not used for the circulation of the heat-exchanging fluid, are either blanked off by a threaded plug or are used to purge any air that may be in the passages for the heat-exchanging fluid.

The amount of heat supplied can also be increased by using several solar panels according to the invention, fitted in series, as shown in FIG. 1. A first panel 24 is connected at its outlet 25 to the inlet 26 of a second panel 27 the outlet of which is in the corner 28 diagonally opposite.

As an example, with respect to the synthetic material that may advantageously be used to produce the two half-shells of the heat exchanger fitted to the solar panel according to the invention, the following materials may be mentioned: injection-moulded polycarbonate, copolymer polycarbonate, polyphenylene-ether (PPE), polymethylmethacrylate (PPMA), polyphenylene sulphides (PPS), polyetherimide (PEI) or an assembly and a complex of synthetic materials containing carbon or glass fibres.

With respect to the translucent cover sheet, glass or polycarbonate may be used.

The solar panel according to the invention may be associated, like conventional panels, with a regulation loop and a storage tank or cylinder to store the hot water thus produced. The storage cylinder may be fitted with an exchanger and an electric resistor depending on the applications.

The invention claimed is:

1. A solar water-heating panel, comprising:
   a heat exchanger of molded synthetic material, having a plurality of passages configured to circulate a heat-exchanging fluid, the passages being defined by parallel longitudinal central projecting ribs provided on two molded identical synthetic material half-shells, each of the two half shells including one projecting edging rib of greater dimension than the central projecting ribs, the two half-shells being bonded or heat sealed together at their respective central ribs to define passages and at their edge ribs to define a sealed hollow edging frame full of confined air on the periphery of the heat exchanger, wherein the two half-shells also include two transverse projecting ribs of the same dimension as the longitudinal rib and defining on two sides of the exchanger, two collector channels in communication with the ends of the passages; and
   at least two attached conduits configured to provide an inlet and outlet for the heat-exchanging fluid, the conduits passing through the hollow edging frame while remaining sealed and emerging into the collector channels.

2. The solar panel according to claim 1, wherein each conduit is fitted with a threaded captive connector nut.

3. The solar panel according to claim 1, wherein a translucent cover sheet is bonded or heat sealed onto the hollow edging frame to define the upper face of the panel.

4. The solar panel according to claim 3, wherein an insulating material is placed on the lower face of the panel.

5. The solar water-heater of claim 3, further comprising one or more panels interconnected in series.

6. The solar panel according to claim 1, wherein an insulating material is placed on the lower face of the panel.

7. The solar panel according to claim 6, wherein the insulating material is delimited by the hollow edging frame and is of such thickness that it does not project substantially relative to the said edging frame.

8. The solar water-heater of claim 7, further comprising one or more panels interconnected in series.

9. The solar water-heater of claim 6, further comprising one or more panels interconnected in series.

10. The solar water-heater, according to claim 1, further comprising one or more panels interconnected in series.

11. The solar panel according to claim 1, wherein each half shell is formed from a synthetic material comprising commingled glass filaments.

12. A solar water-heating panel, comprising:
    a heat exchanger of molded synthetic material, having a plurality of passages adapted for circulation of a heat-exchanging fluid the passages being defined by parallel longitudinal central projecting ribs provided on two molded identical synthetic material half-shells, each of the two half shells comprising one projecting edging rib of greater dimension than the central projecting ribs, the two half-shells being bonded or heat sealed together at their respective central ribs to define passages and at their edge ribs to define a sealed hollow edging frame full of confined air on the periphery of the heat exchanger, one or more panels being connected in series; and
    at least two attached conduits configured to provide an inlet and outlet for the heat-exchanging fluid, the conduits passing through the hollow edging frame while remaining sealed and emerging into the collector channels,
    wherein a translucent cover sheet is bonded or heat sealed onto the hollow edging frame to define the upper face of the panel, and wherein the cover sheet and panel define a clearance therebetween.

* * * * *